US012599931B2

(12) United States Patent
Gunther et al.

(10) Patent No.: US 12,599,931 B2
(45) Date of Patent: Apr. 14, 2026

(54) METHOD OF MANUFACTURING A DECORATIVE PART

(71) Applicant: JOYSONQUIN Automotive Systems GmbH, Rutesheim (DE)

(72) Inventors: Liesa Gunther, Pforzheim (DE); Claudia Wengert, Pforzheim (DE); Claudio Vizziello, Rutesheim (DE)

(73) Assignee: JOYSONQUIN Automotive Systems GmbH, Rutesheim (DE)

( * ) Notice: Subject to any disclaimer, the term of this patent is extended or adjusted under 35 U.S.C. 154(b) by 0 days.

(21) Appl. No.: 18/827,711

(22) Filed: Sep. 7, 2024

(65) Prior Publication Data

US 2025/0083185 A1 Mar. 13, 2025

(30) Foreign Application Priority Data

Sep. 11, 2023 (DE) ......................... 102023124447.7

(51) Int. Cl.

| | |
|---|---|
| ***B05D 5/06*** | (2006.01) |
| ***B05D 1/16*** | (2006.01) |
| ***B05D 3/12*** | (2006.01) |
| ***B44C 3/12*** | (2006.01) |

(52) U.S. Cl.

CPC ............... *B05D 5/061* (2013.01); *B05D 1/16* (2013.01); *B05D 3/12* (2013.01); *B44C 3/12* (2013.01)

(58) Field of Classification Search

CPC .. B05D 1/16; B05D 3/12; B05D 5/061; B44C 3/12; B44C 5/00; B29C 45/14688; B29C 45/14778; B29C 45/1671; B29C 2045/1477; B29L 2031/722

See application file for complete search history.

(56) References Cited

U.S. PATENT DOCUMENTS

2018/0354155 A1 12/2018 Silvestre .................. B27N 3/06

FOREIGN PATENT DOCUMENTS

| | | | | |
|---|---|---|---|---|
| DE | 102004040380 | | | 3/2006 |
| DE | 102016003463 | B4 | | 9/2019 |
| EP | 2298528 | | | 3/2011 |
| JP | H0747629 | A | * | 2/1995 |
| JP | 2002127348 | A | * | 5/2002 |

OTHER PUBLICATIONS

German Search Report (Recherchebericht) and opinion, in counterpart application No. 102023124447.7, dated Aug. 1, 2024, 6 pages.

* cited by examiner

*Primary Examiner* — William P Fletcher, III

(74) *Attorney, Agent, or Firm* — Fattibene and Fattibene, LLC; Paul A. Fattibene

(57) ABSTRACT

A method for producing a decorative part in which a decorative layer is arranged on a visible side of a substrate and the decorative layer is provided with a visible-side coating. In the method according to the invention, particulate decorative material is provided for producing the decorative layer, which is applied to a flat substrate.

20 Claims, No Drawings

METHOD OF MANUFACTURING A DECORATIVE PART

FIELD OF THE INVENTION

The invention relates to a method for producing a decorative part, in which a decorative layer is arranged on a visible side of a carrier and the decorative layer is provided with a visible-side coating.

BACKGROUND OF THE INVENTION

Decor parts, such as those used in particular in the interiors of motor vehicles, are molded parts which generally have a carrier and a decorative layer applied to the carrier. The decorative layer is arranged on the side of the decorative part facing the user and thus the carrier, thus forming the so-called visible side of the decorative part. The opposite side of the decorative part is formed by the carrier and can be referred to as the mounting side. The carrier provides the decorative part with the necessary dimensional stability and is usually used to attach the decorative part.

Decor parts must meet high requirements in terms of their visual and tactile quality as well as dimensional accuracy and resistance to environmental influences. For this purpose, the decorative layer is usually provided with a protective transparent top layer.

A method for producing a decorative part with a transparent top layer is disclosed, for example, in EP 2 298 528 A1. Here, a decorative layer is laminated with a transparent film on the side facing the visible side and with a barrier layer on the side facing the assembly side. The laminated decorative layer is formed into a preform, which is then overmolded with a transparent plastic to form the cover layer and back-molded with a load-bearing plastic to form the carrier. The result is a decorative part in which a transparent film is arranged between the cover layer and the decorative layer and in which a barrier layer is arranged between the carrier and the decorative layer.

SUMMARY OF THE INVENTION

The present invention seeks to provide a method for manufacturing a decorative part which enables a new design and design statement for the decorative part. The method is intended to be particularly suitable for manufacturing interior trim parts for motor vehicles, and is thus suitable for mass production with essentially consistent quality of the decorative part.

With this in mind, the present invention proposes a method for producing a decorative part in which, in addition to the generally conventional steps, a particulate decorative material is provided and the particulate decorative material is applied to a areal substrate.

DETAILED DESCRIPTION OF THE PREFERRED EMBODIMENTS

The areal substrate can be colored in one or more colors, transparent or translucent. The areal substrate can take part in the design effect in its own right or merely be a carrier for the piece in the decorative material for attachment to the carrier or form part of the carrier itself.

The carrier of the decorative part is preferably made of plastic in a manner known per se and is used for handling and regularly also for mounting the decorative part in the vehicle. The carrier usually has fastening elements on its mounting side for latching, gluing or otherwise connecting the decorative part to the chassis of the vehicle.

In particular, the substrate can be adhesive or adhesively coated so that the particulate decorative material adheres to the substrate. The substrate can be a nonwoven, a hotmelt, a plastic film or even a finished part, particularly one made of plastic. The substrate can be formed in one piece with the carrier.

The substrate can be made of a synthetic or natural material. A plastic is a synthetic material in this sense. A mineral component can be a natural material that forms the substrate or is enclosed by it.

The particulate decorative material can be dyed, possibly also colored in different colors or brightly colored.

The particulate decorative material can be metallic or synthetic decorative material. The particulate decorative material can be produced by milling or chipping, atomizing, crushing or grinding or in another way as a powder. The particulate decorative material may include chippings or swarf or glitter.

The particulate decorative material is particularly preferably a natural material. This results in an aesthetic appearance on the visible side of the decorative part that is predetermined by the natural properties of the chunky decorative material. A natural material offers the advantage of a surface design and/or coloring that is not completely uniform. These differences in the individual pieces or fractions of the particulate decorative material are preferably used to create an individual aesthetic appearance on the side of the decorative part. The use of natural materials leads to the appearance of a rather random design. The natural particulate material can be selected from the group comprising mineral particulate decorative material or organic particulate decorative material. These materials can also be used in combination to produce the decorative part. In particular, slate or mica can be considered as a mineral particulate material. Eggshell, mother-of-pearl or tortoiseshell are the preferred organic particulate materials. The natural materials can also be color-modified by pigmentation, for example by spraying or dipping, or by a chemical process. A surface on the side of the particulate decorative material is usually only modified to such an extent that the natural inhomogeneity of the particulate decorative material can still be recognized.

According to the present invention, particulate decorative material is understood in particular to be a decorative material with a particle size of between 0.1 and 50 mm, preferably of between 2 and 25 mm, particularly preferably of between 0.25 and 10 mm.

According to a preferred further development of the present invention, providing particulate decorative material comprises cleaning and/or fractionating the particulate decorative material. The cleaning can be carried out with the aim of removing unstable organic residues of the starting material. Cleaning can include chemical cleaning or modification. If the cleaning is carried out in liquid form, the cleaning step usually also includes a drying step. Drying or cleaning can take place before or after fractionation. Fractionation can be carried out by sieving or classifying. The desired particle size or particle size distribution can also be set by crushing the particulate material.

It is understood that the particulate material can initially be divided into fractions of different particle size and/or color, material or other properties of the decorative material and that the different fractions can be mixed or combined in surface areas that can lie next to each other on the decorative part.

Preferably, the particulate decorative material is applied to the substrate in a predetermined pattern. This pattern can consist of and be formed by a single particulate decorative material. Different particle fractions can also be mixed in one pattern. The pattern can also consist of different particulate decorative materials.

It can be applied by hand or with a squeegee. The particulate material can be bonded to the substrate on its own or contained in a suspension containing the particulate decorative material and a carrier liquid. The liquid can merely be a carrier for the application of the particulate decorative material and evaporate through evaporation or drying. However, the liquid of the suspension can also be part of the design in itself and in particular be colored, translucent or transparent colored or crystal clear, so that, for example, the visible side of the carrier can be seen through or next to the individual particles of the particulate material on the visible side and the aesthetic appearance of the decorative part is co-determined by the material and/or surface texture of the carrier.

The particulate material can be applied to the substrate by separating it using a frequency, for example a vibrating table. The substrate can also be a medium-permeable substrate, such as a fleece or a perforated substrate made of a material that is impermeable to the medium. A suction pressure can act through the substrate, which sucks the particulate decorative material towards the substrate and holds it there or at least temporarily bonds it to the substrate, for example by adhering to an adhesive or adhesively coated substrate.

It is understood that a predetermined suction pattern can be generated on the side opposite the decorative material, for example, either by corresponding temporal and/or spatial distribution of negative pressure areas on the surface of the substrate or by a pinhole or the like. In the latter case, the application of a suction pressure does not result in the substrate being coated with the particulate decorative material over the entire surface of the substrate. Rather, the substrate is only provided with the particulate decorative material where the suction pressure acts. This allows a pattern to be created from the particulate decorative material. It is understood that the suction pattern on the side opposite the particulate material can be generated differently at different stations of a continuous treatment line for the substrate. A different decorative material can be connected to the substrate at each of the stations. This can also result in a corresponding pattern.

For the same reasons, a template can be provided when applying the decorative material, for example by scattering or the like, through which a pattern of the particulate decorative material is applied in a predetermined manner. The template may have recesses in the desired design through which the particulate material is applied to the substrate.

According to a preferred further development of the present invention, the particulate decorative material is applied to the substrate in such a way that the decorative layer is formed on the visible side by the particulate material and the substrate and/or the aesthetic design is also determined by a visible surface of the carrier. As previously mentioned, the substrate or the carrier can be transparent or translucent. The substrate can also be realized unevenly together with the decorative material, so that parts of the carrier are exposed on the visible side, while others are completely covered and/or covered by the particulate decorative material and/or the substrate.

This can be done in various ways. For example, fleece or paper can be coated with a varnish or glue or a powder coating. The particulate decorative material in the form of particles or flakes is sprinkled or sprayed onto this flat carrier while the glue, varnish or adhesive powder coating is not yet cured and is bonded to the carrier, or at least fixed to it, during the curing process. During the curing process, the various layers can be laminated in a press under heat and pressure in order to arrange the particles in a plane. The decorative layer with the desired dimensions for the decorative part can be produced from a corresponding flat layer by punching. This decorative layer can then be back-injected to form the carrier and provided with a layer of lacquer or coating on the visible side, which can also be applied by injection molding. To make the injection-molded carrier visible, the particles of the particulate decorative material can be applied to a transparent or translucent film that is provided with an adhesive, for example resin, to fix the particles in a continuum. This film can be back-molded to the substrate or glued to a substrate. The visible side can then be coated with an opaque paint.

The particles of particulate decorative material can be applied to a carrier, in particular one of the aforementioned type, and fixed in the injection mold via this carrier in such a way that the particles of decorative material are arranged between the carrier and the mold cavity. After back-injection to embed the particles, the carrier can be removed. A top layer can then be applied on the visible side. The carrier can be structured three-dimensionally in order to arrange the particles in the carrier with a profiling transverse to the surface extension of the decorative part. After coating the visible side with a transparent or translucent coating, the optical depth effect is enhanced.

Alternatively, the particles of the particulate decorative material can also be embedded in or mixed with a liquid matrix of a hardening, possibly translucent or transparent material. This suspension is, for example, formed or drawn out with a squeegee as a flat sheet layer, possibly for handling purposes on a film, which can be removed again as part of the further manufacturing steps. After the matrix has hardened and, if necessary, been cut to the appropriate size, the decorative layer is back-molded or over-molded.

With a view to increasing the design possibilities and also for better support, in particular of a relatively brittle decorative material, by embedding and with a view to the coating of the visible side with the coating, which is usually carried out by injection molding, it is proposed, in accordance with a preferred further development of the present invention, that the decorative material be at least partially embedded in the substrate or that a paste be introduced between the piece decorative material. In this case, a portion of the substrate or the paste can be located at the level of the visible surface of the particulate decorative material. The particulate decorative material then protrudes less from the substrate than if the particulate decorative material was only applied to the substrate. The particulate decorative material can also be introduced into the substrate during injection molding if, for example, the particulate decorative material is regularly mixed with a small cone size of no more than 1 mm with the plastic granulate fed to the injection molding machine, either beforehand or when it is introduced into the injection molding machine. This melt provided with the particulate decorative material is injection molded to produce the carrier, which in itself can already form the decorative part. If required, this part can be placed in another injection mold and overmolded with plastic material on the rear or visible side to produce a carrier or a visible coating.

Alternatively, in two-component injection molding, a plastic carrier can be formed first, which is overmolded with the melt containing the particulate decorative material after being transferred to another mold cavity. If required, this part can also be placed in another injection mold and overmolded with plastic material on the visible side to produce the carrier or the transparent or translucent visible coating.

The high pressure exerted during injection molding increases the appearance of a planar surface formed by a large number of individual particles of the particulate decorative material. The visible coating, which is usually a plastic applied by injection molding, protects the decorative surface produced in this way from environmental influences and achieves a smooth and technical-looking surface finish.

To increase the appearance of a continuum, according to a preferred further embodiment of the present invention it is proposed to crush the particulate decorative material when it is applied to the substrate, in particular to break the particulate decorative material when it is pressed against the substrate. For example, the areal substrate and the particulate decorative material can be joined together in a continuous process in which both are moved in a uniform direction of movement, while the decorative material is moved on a carrier such as a conveyor belt and the substrate is brought increasingly closer to the decorative material and finally pressed against it. This can cause a fragile decorative material to break, whereby the particles, which initially form a larger piece, remain in the immediate vicinity by bonding with the substrate and thus cover the substrate over a fairly large area.

It is understood that the particulate material can be painted and/or sanded after application to the substrate, if necessary with the substrate. After sanding, the sanded surface is usually cleaned. This allows sanding particles or sanding dust to be removed by blowing or wiping.

The production of a decorative part whose decorative layer comprises eggshells is described below as an example.

The eggshells are cleaned as particles or in eggshell halves with a chlorine-water mixture for a certain period of time. This dissolves superficial soiling and the inner egg membrane. The eggshells are then dried.

In the next step, the dried eggshells are crushed. The various particle size fractions are then divided into specific particle size classes by sieving.

The eggshells are placed on the matrix or embedded within a matrix. The eggshells are applied evenly to the matrix by scattering. The eggshells are applied to the matrix either by hand, using a squeegee or by separating them by applying a frequency. The matrix is bonded to the eggshells under pressure and temperature.

The matrix produced in this way, covered with eggshells, is placed in a mold and back-injected with a plastic material that forms the carrier. The semi-finished product produced in this way is transferred to another injection mold and overmolded with a coating on the visible side to produce a visible coating.

What is claimed is:

1. A method for producing a decorative part in which a decorative layer is arranged to be visible from a visible side of the decorative part and the decorative layer is provided with a coating on a surface of the decorative part, wherein the method of producing the decorative layer comprises the steps of:

providing particulate decorative material; and applying the particulate decorative material to the surface.

2. The method according to claim 1, wherein:

the particulate decorative material is a natural material selected from the group consisting of mineral particulate decorative material, and organic particulate decorative material.

3. The method according to claim 1, wherein:

the particulate decorative material has a particle size of between 0.1 and 50 mm.

4. The method according to claim 1, wherein:

said step of providing particulate decorative material comprises at least one of cleaning, fractionating, or crushing the particulate decorative material.

5. The method according to claim 1, wherein:

the particulate decorative material is applied to the surface in a predetermined pattern of a single particulate decorative material.

6. The method according to claim 1, wherein:

the particulate decorative material is applied to the surface in a predetermined pattern of different particulate decorative materials.

7. The method according to claim 1, wherein:

the particulate decorative material is applied to the surface in a random pattern of different particulate decorative materials.

8. The method according to claim 1, wherein:

the particulate decorative material is applied to the surface in such a way that the decorative layer is visible from the visible side of the decorative part by the particulate decorative material and a substrate.

9. The method according to claim 1, wherein:

the particulate decorative material is applied to the surface in such a way that the decorative layer is visible from the visible side of the decorative part by the particulate decorative material and a carrier.

10. The method according to claim 1, wherein:

the particulate decorative material is applied to the surface in such a way that the decorative layer is visible from the visible side of the decorative part by the particulate decorative material and a substrate and a carrier.

11. The method according to claim 1, wherein:

the particulate decorative material is at least partially introduced into the surface.

12. The method according to claim 1, wherein:

a paste is introduced between the particulate decorative material.

13. The method according to claim 1, wherein:

the particulate decorative material is at least partially introduced into the surface and a paste is introduced between the particulate decorative material.

14. The method according to claim 1, wherein:

the particulate decorative material is crushed when it is applied to the surface.

15. The method according to claim 14, wherein:

the particulate decorative material is applied to the surface by being pressed against the surface.

16. The method according to claim 1, wherein:

the particulate decorative material is painted after being applied to the surface.

17. The method according to claim 1, wherein:

the particulate decorative material is sanded after being applied to the surface.

18. The method according to claim 1, wherein:

the particulate decorative material is painted and sanded after being applied to the surface.

19. A method of producing a motor vehicle interior decorative part having a visible side comprising the steps of:

providing a particulate decorative material;

attaching the particulate decorative material to a surface; and forming a carrier incorporating the surface into a shape configured for attaching to an interior of a motor vehicle wherein the particulate decorative material is visible from the visible side of the motor vehicle interior decorative part; and installing the motor vehicle interior decorative part in an interior of a motor vehicle wherein the particulate decorative material is visible from the interior of the motor vehicle.

20. A method for producing a decorative part in which a decorative layer is arranged to be visible from a visible side of the decorative part and the decorative layer is provided with a coating on a surface of the decorative part, wherein the method of producing the decorative layer comprises the steps of:

providing particulate decorative material;

applying the particulate decorative material to the surface; and wherein the particulate decorative material is applied to the surface by a suction pressure acting through the surface on a side opposite the particulate decorative material.

* * * * *